United States Patent
Barnett et al.

(10) Patent No.: US 8,020,363 B1
(45) Date of Patent: Sep. 20, 2011

(54) ROCK GUARD FOR THE CUTTER BAR OF A ROTARY DISK HEADER

(75) Inventors: Neil Gordon Barnett, Winnipeg (CA); Marcel Remillard, St. Joseph (CA)

(73) Assignee: Macdon Industries Ltd, Winnipeg (CA)

( * ) Notice: Subject to any disclaimer, the term of this patent is extended or adjusted under 35 U.S.C. 154(b) by 0 days.

(21) Appl. No.: 12/829,791

(22) Filed: Jul. 2, 2010

(51) Int. Cl.
*A01D 34/00* (2006.01)

(52) U.S. Cl. ......................................... 56/17.4

(58) Field of Classification Search ............... 56/17.4, 56/17.3, 14.5, 6, 295, 192
See application file for complete search history.

(56) References Cited

U.S. PATENT DOCUMENTS

| | | | | |
|---|---|---|---|---|
| 3,469,378 A | * | 9/1969 | Heesters et al. | 56/11.9 |
| 4,201,033 A | * | 5/1980 | Meek et al. | 56/13.6 |
| 4,227,365 A | * | 10/1980 | van der Lely et al. | 56/13.6 |
| 4,365,462 A | * | 12/1982 | Werner et al. | 56/255 |
| 4,577,456 A | * | 3/1986 | van der Lely et al. | 56/13.6 |
| 4,709,540 A | | 12/1987 | Collart | |
| 4,720,964 A | * | 1/1988 | Ermacora et al. | 56/13.6 |
| 4,763,463 A | * | 8/1988 | Ermacora et al. | 56/13.6 |
| 4,811,553 A | * | 3/1989 | Ermacora et al. | 56/136 |
| 4,815,262 A | * | 3/1989 | Koch et al. | 56/13.6 |
| 4,833,868 A | * | 5/1989 | Ermacora et al. | 56/13.6 |
| 4,840,019 A | * | 6/1989 | Pingry | 56/13.6 |
| 4,955,187 A | * | 9/1990 | van der Lely | 56/13.6 |
| 5,012,635 A | * | 5/1991 | Walters et al. | 56/13.6 |
| 5,715,662 A | * | 2/1998 | Walters | 56/6 |
| 5,715,663 A | * | 2/1998 | Getz | 56/6 |
| 5,784,866 A | * | 7/1998 | Campbell et al. | 56/6 |
| 5,809,757 A | * | 9/1998 | McLean et al. | 56/13.6 |
| 5,875,619 A | * | 3/1999 | McLean et al. | 56/6 |
| 5,907,948 A | * | 6/1999 | Ellis | 56/13.6 |
| 5,937,624 A | * | 8/1999 | McLean et al. | 56/13.6 |
| 5,964,079 A | * | 10/1999 | Mellin et al. | 56/13.6 |
| 5,996,323 A | * | 12/1999 | Campbell et al. | 56/6 |
| 6,502,377 B2 | * | 1/2003 | Kraus | 56/6 |
| 7,661,253 B2 | | 2/2010 | Pruitt | |
| 7,730,703 B1 | * | 6/2010 | Ehrhart et al. | 56/13.6 |
| 2002/0157363 A1 | * | 10/2002 | Kraus | 56/6 |
| 2008/0066439 A1 | | 3/2008 | Barnett | |
| 2008/0066440 A1 | | 3/2008 | Barnett | |
| 2008/0066441 A1 | | 3/2008 | Barnett | |
| 2009/0071116 A1 | | 3/2009 | Barnett | |

FOREIGN PATENT DOCUMENTS

EP  1 369 019  10/2003

* cited by examiner

*Primary Examiner* — Arpad Fabian-Kovacs

(74) *Attorney, Agent, or Firm* — Adrian D. Battison; Ade & Company Inc.

(57) ABSTRACT

A crop header includes a cutter bar carrying rotary cutter disks spaced along a gear case. A support beam extends behind the gear case and carries rock guards side by side along the cutter bar and each extending from the beam forwardly underneath the gear case in front of the gear case. Each rock guard includes a rear bolt fastening to the beam and a second forward bolt fastening arrangement to the beam with and is cantilevered forwardly from the supports for support of the forward end of the gear case. The guards include butting side edges each to the next at positions between the disks so that the curved front edges of the rock guards meet at a recessed front position of the front edges between the disks with a cast notch guard member bridging the front edges of two rock guards.

24 Claims, 5 Drawing Sheets

ROCK GUARD FOR THE CUTTER BAR OF A ROTARY DISK HEADER

This invention relates to a crop harvesting header which has a cutter bar which carries and drives a plurality of transversely spaced rotary disks and particularly to rock guard for mounting underneath the cutter bar.

This application relates to the subject matter disclosed in the following documents:

US Published Application 2009/0071116 filed Jul. 23, 2008 and published Mar. 19, 2009 which corresponds to Canadian application 2,639,032 and entitled CROP HARVESTING HEADER WITH ROTARY DISKS AND IMPELLERS FOR TRANSFERRING THE CROP INWARDLY TO A DISCHARGE OPENING;

US Published Application 2008/0066440 filed Sep. 15, 2006 and published Mar. 23, 2008 which corresponds to Canadian application 2,559,353 and entitled CROP HARVESTING HEADER WITH ROTARY DISKS AND IMPELLERS FOR TRANSFERRING THE CROP INWARDLY TO A DISCHARGE OPENING;

US Published Application 2008/0066441 filed Sep. 15, 2006 and published Mar. 23, 2008 which corresponds to Canadian application 2,559,217 and entitled CROP HARVESTING HEADER WITH ROTARY DISKS AND A TRANSFER ROLLER CARRYING THE CUT CROP TO THE NIP OF A PAIR OF CONDITIONING ROLLS;

US Published Application 2008/0066439 filed Feb. 15, 2007 and published Mar. 23, 2008 which corresponds to Canadian application 2,578,907 and entitled CROP HARVESTING HEADER WITH ROTARY DISKS AND IMPELLERS FOR TRANSFERRING THE CROP INWARDLY TO A DISCHARGE OPENING.

Reference is also made to co-pending application Ser. No. 12/817,267 filed Jun. 17, 2010 and entitled CROP HARVESTING HEADER WITH ROTARY DISKS AND AUGER FOR TRANSFERRING THE CROP TO A DISCHARGE OPENING claiming priority from Provisional Application 61/223,967 filed Jul. 8, 2009.

The disclosures of the above published applications are incorporated herein by reference or the disclosures may be referred to by the reader for further detail of the subject matter disclosed herein.

BACKGROUND OF THE INVENTION

Rotary disk mowers are well known and widely used and typically include a transverse cutter bar defined by a support beam and a gear casing carried on the beam with the gears acting to drive the rotary disks about vertical axes along the cutter bar. Underneath the cutter bar is provide a series of rock guards which underlie the cutter bar and act as replaceable wear guards to protect the cutter bar. A number of examples of such rock guards are shown in the prior art.

U.S. Pat. No. 4,709,540 (Collart) issued Dec. 1, 1987 and assigned to Zweegers discloses a mowing device has a number of adjacent cutter disks rotatable around upwardly extending axes of rotation of a cutter bar. The cutting disks are supported by an elongated hollow gear casing located under the cutting disks with gears for driving at least some of the cutting elements located in the casing. A reinforcing beam, extending along the rear side of the casing, is fixed to said casing and carries the rear ends of tensioned resilient straps extending transverse to the beam and under the casing and joined to the casing near their front ends at the side of the casing away from the reinforcing beam. The straps support a protective plate underneath the cutter bar and extending along its full length U.S. Pat. No. 7,661,253 (Pruitt) issued Feb. 16, 2010 and assigned to AGCO discloses a modular rotary cutter bed formed by a series of identical cutter modules mounted end-to-end along the length of a common support beam. Guards for the cutters of the modules are arranged underneath the cutter bar side by side along the cutter bar. Each guard overlaps and bridges the seam between an adjacent pair of modules so as to increase the structural rigidity of the cutter bed. Each guard is attached at its front end to the noses of a pair of adjacent modules and at its rear end to the support beam to increase structural integrity in all directions. A second embodiment does not utilize a common support beam for the modules but instead relies upon the interconnections between adjacent modules and the bridging overlap of the guards to make the cutter bed rigid.

In European 1 369 019 (Epp) assigned to Claas and published Oct. 12, 2003 is disclosed an arrangement in which a series of rock guard elements are arranged side by side across the cutter bar and fastened to the structure at the rear so as to extend forwardly therefrom to a forward edge underneath the cutter disk.

SUMMARY OF THE INVENTION

It is one object of the invention to provide a crop harvesting header of the above general type including a guard plate under the gear case for the rotary disks.

According to a first aspect of the present invention there is provided a crop harvesting header comprising:

a cutter bar mounted on a header frame across a width of the header for movement across the ground in a forward harvesting direction for harvesting the standing crop;

the cutter bar including a longitudinally extending hollow gear case;

a plurality of generally horizontal cutter disks mounted on the cutter bar at positions spaced along the cutter bar with the disks being mounted on the cutter bar for driven rotation about respective generally upright axes spaced along the cutter bar;

each disk having mounted thereon at a position spaced outwardly from the respective axis thereof at least one cutter blade such that rotation of the disk about its axis causes a standing crop to be cut by the blade as it rotates around the axis on the disk;

the gear case including a gear train arranged to drive the cutter disks;

the cutter bar including a support beam extending along the gear case rearwardly of the gear case;

and a plurality of guard plate members arranged side by side along the cutter bar and each extending from the beam forwardly underneath the gear case to a forward position in front of the gear case;

wherein each of the guard plate members includes a first rear fastening arrangement by which the member is connected to the beam and a second forward fastening arrangement by which the member is connected to the beam with the second fastening arrangement being forward of the first fastening arrangement.

Preferably the first fastening arrangement is behind the beam and the second fastening arrangement is in front of the beam. For this purpose, preferably the beam includes a rearwardly extending flange to which the first fastening arrangement is attached and a forwardly extending flange to which the second fastening arrangement is attached. However other mounting arrangements and locations can be used with the intention that the guard plate members are supported by the beam with sufficient strength to be cantilevered forwardly from the first and second fastening arrangements to the forward position and connected to the gear case to provide support therefor.

Preferably the beam comprises a rectangular tube.

Preferably each of the fastening arrangements comprises a pair of bolts which are recessed from a bottom surface of the guard plate member.

Preferably each guard plate member includes a return portion fastened to the forward position in front of the gear case and extending rearwardly to the gear case so as to be fastened thereto.

Preferably the guard plate members include butting side edges each to the next so as to provide a continuous guard fully covering the underside of the casing.

Preferably each guard plate member underlies a respective one of the disks and includes a curved front edge generally following an arc surrounding the axis of the respective disk.

Preferably the guard plate members include butting side edges each to the next at positions between the disks so that the curved front edges meet at a recessed front position of the front edges between the disks and wherein there is provided in front of the gear case a notch guard member bridging the front edges of two guard plate members between each guard plate member and the next.

Preferably each notch guard member covers the front edge of the guard plate members at the recessed portion.

Preferably each notch guard member has a thickness greater than that of the front edge of the guard plate members.

Preferably each notch guard member is a cast wear part.

Preferably each notch guard member has a top surface contiguous with a top surface of the adjacent guard plate members and a bottom surface projecting downwardly at least to a level with a bottom surface of the adjacent guard plate members.

Preferably each notch guard member is screw fastened to the gear case.

According to a second aspect of the present invention there is provided a crop harvesting header comprising:

a cutter bar mounted on a header frame across a width of the header for movement across the ground in a forward harvesting direction for harvesting the standing crop;

the cutter bar including a longitudinally extending hollow gear case;

a plurality of generally horizontal cutter disks mounted on the cutter bar at positions spaced along the cutter bar with the disks being mounted on the cutter bar for driven rotation about respective generally upright axes spaced along the cutter bar;

each disk having mounted thereon at a position spaced outwardly from the respective axis thereof at least one cutter blade such that rotation of the disk about its axis causes a standing crop to be cut by the blade as it rotates around the axis on the disk;

the gear case including a gear train arranged to drive the cutter disks;

the cutter bar including a support beam extending along the gear case rearwardly of the gear case;

and a plurality of guard plate members arranged side by side along the cutter bar and each attached to the beam and extending from the beam forwardly underneath the gear case to a forward position in front of the gear case;

wherein each guard plate member is supported by the beam so that it is cantilevered forwardly from the beam to the forward position and is connected to the gear case to provide support therefor.

According to a third aspect of the present invention there is provided a crop harvesting header comprising:

a cutter bar mounted on a header frame across a width of the header for movement across the ground in a forward harvesting direction for harvesting the standing crop;

the cutter bar including a longitudinally extending hollow gear case;

a plurality of generally horizontal cutter disks mounted on the cutter bar at positions spaced along the cutter bar with the disks being mounted on the cutter bar for driven rotation about respective generally upright axes spaced along the cutter bar;

each disk having mounted thereon at a position spaced outwardly from the respective axis thereof at least one cutter blade such that rotation of the disk about its axis causes a standing crop to be cut by the blade as it rotates around the axis on the disk;

the gear case including a gear train arranged to drive the cutter disks;

the cutter bar including a support beam extending along the gear case rearwardly of the gear case;

and a plurality of guard plate members arranged side by side along the cutter bar and each attached to the beam and extending from the beam forwardly underneath the gear case to a forward position in front of the gear case;

wherein the guard plate members include butting side edges each to the next so as to provide a continuous guard fully covering the underside of the casing.

each guard plate member underlies a respective one of the disks and includes a curved front edge generally following an arc surrounding the axis of the respective disk.

wherein the guard plate members include butting side edges each to the next at positions between the disks so that the curved front edges meet at a recessed front position of the front edges between the disks and wherein there is provided in front of the gear case a notch guard member bridging the front edges of two guard plate members between each guard plate member and the next.

Preferably the gear train in the gear case is formed by a series of intermeshing gears such as spur or bevel, although other drive arrangements can be used.

The cutter bar may be formed as a single piece driven from one end or may be formed in two or more sections.

Where impellers are used, these are typically of the type shown in previously mentioned U.S. Pat. No. 7,340,876 issued Mar. 11, 2008 which corresponds to US Published Application 2008/0066440 filed Sep. 15, 2006 and published Mar. 23, 2008 and to Canadian application 2,559,353 of an hour glass shape. Such impellers are commonly of the type using angularly spaced bars but can also be of the type which are formed by solid drums which may or may not have external crop engaging elements formed on the outside surface of the drum.

The conditioner defined herein may be or the type using a pair of fluted rollers defining a nip. However other types of conditioner can also be used. Also in some cases the header can be used without a conditioner so that the crop material is deposited directly onto the ground or collected.

This design described in more detail hereinafter provides a structure for supporting a cutter bar housing of minimal thickness. The lower running surface of the header is generally below the cutter bar so it needs to provide protection from wear. The area of highest wear and damage is generally found between the discs where cutting discs converge. Typically, a seam exists between adjacent rock guards at this location that is susceptible to damage.

This design consists of a series of rock guards that cover the entire running surface of the cutter bar. The rock guards are mounted to the cradle structure, which consists of a rectangular beam with a mounting flange structure fastened front and rear. The mounts are recessed from the bottom surface, so the bolts used to mount the rock guard are protected from wear. In addition, the rock guard is also connected to a front flange of the cutter bar. By bolting the rock guard to the beam in two positions fore/aft, there is provided a significantly stronger mount for the cutter bar, in addition to providing complete wear protection. The cutter bar is also connected to the mounting flange welded to the front of the rectangular beam. In addition, an additional notch guard is provided at the front of the cutter bar where adjacent discs intermesh. This protects the fore/aft seam between rock guards and allows for replacement of the portion of the structure that is most susceptible to wear and damage. This structure can provide for use of only two layers of steel under the gear train, that is a bottom sheet of the gear case itself and the rock guard plate under that sheet, which allows for the minimum possible cutting height.

Most of the prior art relies on the cutter bar housing or gear case itself for structure. This requires the gear case to be much heavier than is required for enclosing the cutting components. In addition, this design becomes less practical when large distances are required to be spanned to provide a cutter bar of increased width. Some designs use a cast iron gear casing with steel tie rods. This generally results in thicker members underneath the gears thus lifting the cutter disks and increasing the cutting height. Many designs have a full length seam between rock guards fore/aft, either centered between discs or on the axes of the discs. Using an arrangement with the seam between the disks, by incorporating a notch guard at this location, the seam is protected and it allows for the notch guard that is susceptible to being damaged to be a cast wear item screw fastened in place so as to be easily replaced.

BRIEF DESCRIPTION OF THE DRAWINGS

In the drawings like characters of reference indicate corresponding parts in the different figures.

DETAILED DESCRIPTION

Figure 1:
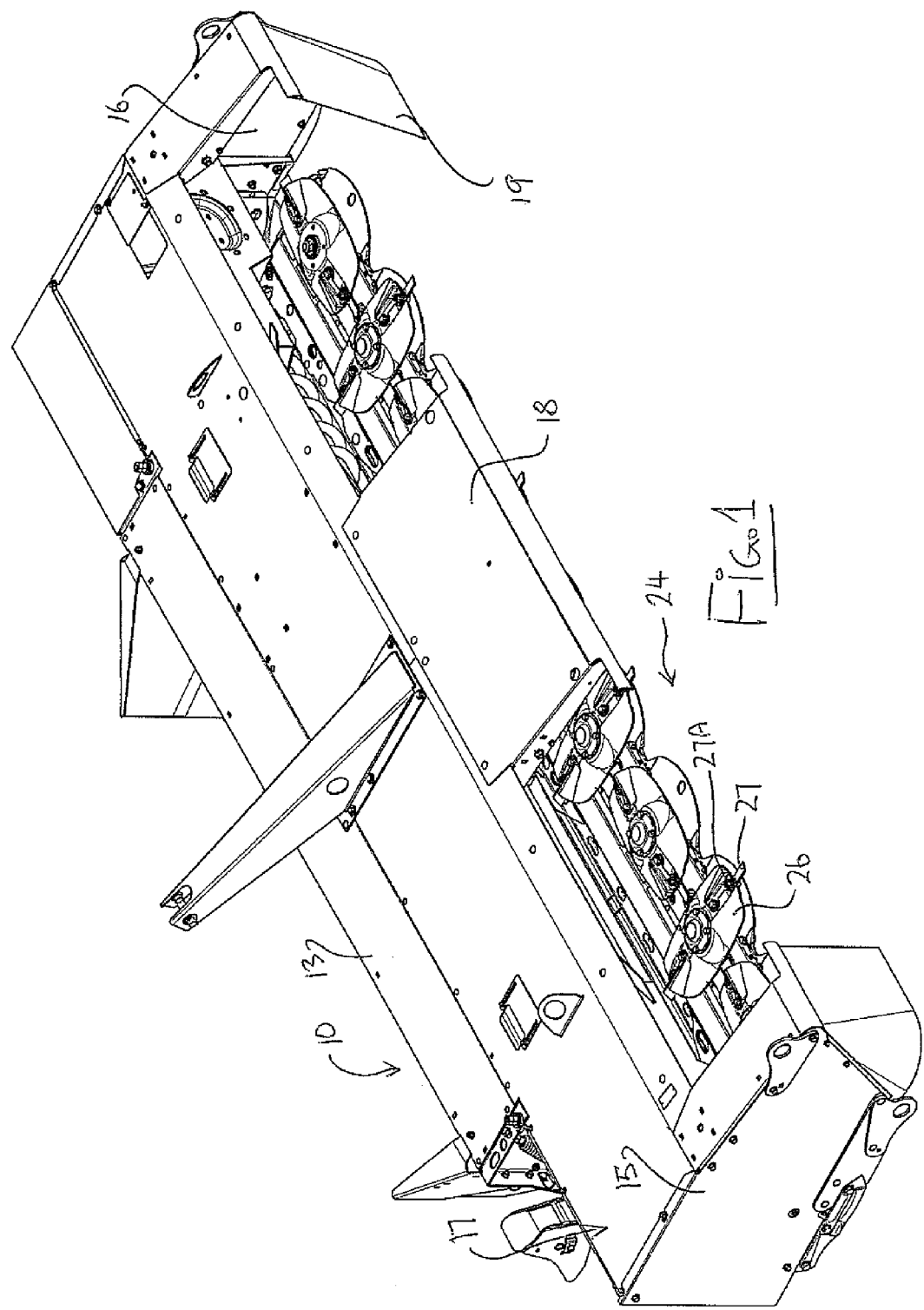
FIG. 1 is an isometric view from the front and one side of a header of the type with which the present invention is concerned.
Figure 2:
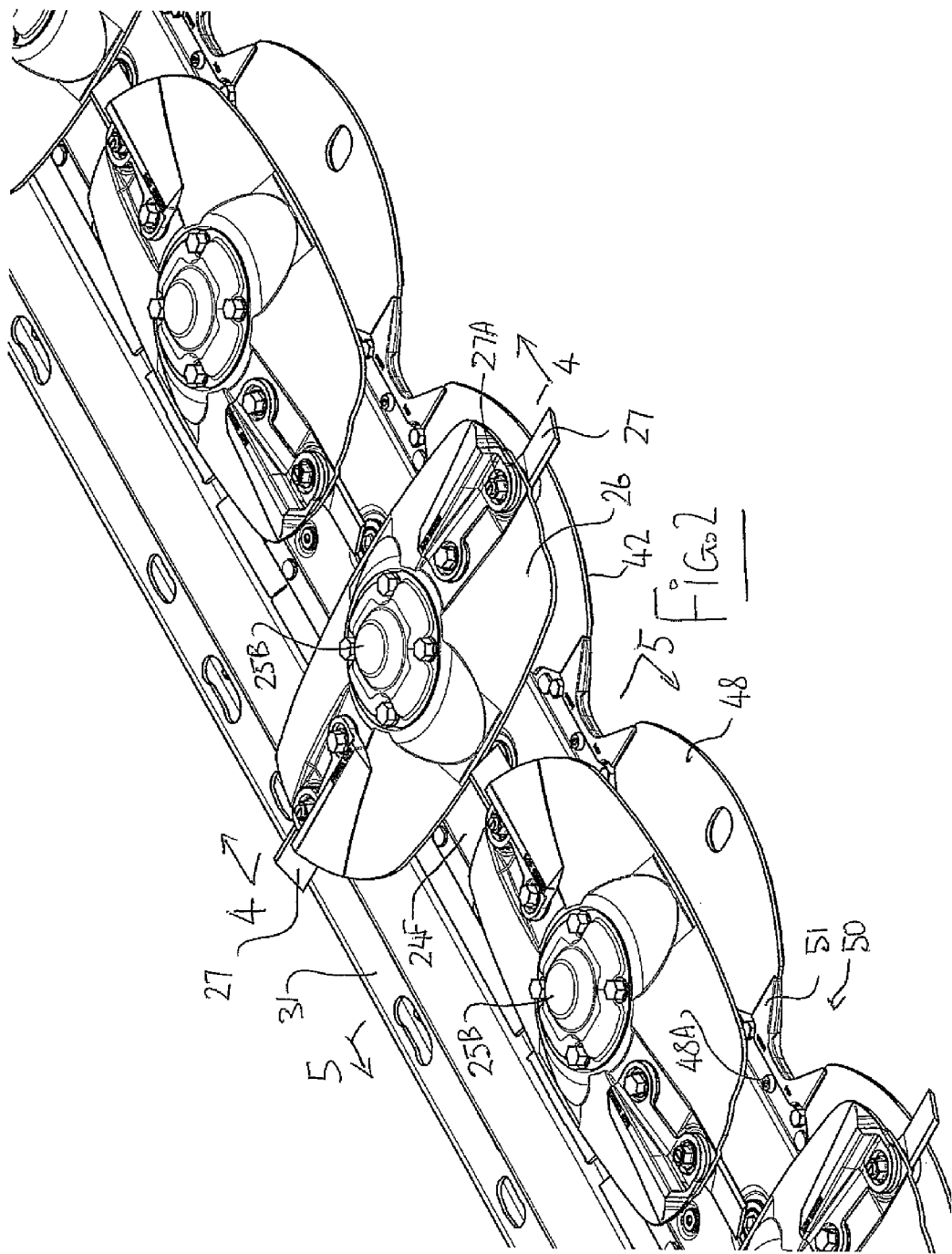
FIG. 2 is an isometric view from the top on an enlarged scale of the cutter bar only of the header of FIG. 1.

In FIG. 1 is shown a header 10 for attachment to conventional swather tractor of the well known type having driven ground wheels and rear castor wheels. A front support assembly of the tractor carries the header including left and right lift arms which carry the header in a floating action across the ground along bottom guard plates of the header. The header includes side walls 15 and 16 forming part of a frame 17 attached to the lift system of the tractor. The frame carries top covers 18 which support a front skirt 19 in front of the cutter bar.

The frame 17 includes a main transverse beam 13 which is attached to the tractor. The main beam carries the side walls 15 and 16. The side walls each comprises a vertical wall extending forwardly to a front edge in front of a cutter bar 24 including a gear case 24A. Within the gear case 24A of the cutter bar 24 is provided a gear train 25 (FIGS. 4 and 5) of meshing spur gears 25A carried on suitable bearings 25BB so as to provide communication of drive to a number of vertical shafts 25B carried on the cutter bar each connected to a respective one of the gears 25A for rotating a generally horizontal disk 26 about a vertical axis of the shaft. The disks are substantially identical. The disks 26 are generally elliptical in shape so that a length between two ends is significantly greater than a distance between the side edges in a direction at right angles to the length. At each of the ends is mounted a respective one of a pair of flail blades 27 each for pivotal movement about a flail mounting pin 27A at the edge of the disk. The mounting pins 27A are arranged at the ends and thus at the maximum extent of the disk so that the flails project outwardly beyond the edges of the disk for rotation in a common horizontal cutting plane generally parallel to the plane of the cutter bar in a cutting action.

The disks are intermeshed so as to driven synchronously and they are arranged at 90° phase difference so that adjacent pairs of the disks are at 90° offset as they rotate to avoid interference between the disks and the blades 27 carried thereby.

Further details of this construction are available from one or more of the above prior applications of the present applicant, the disclosures of which are incorporate herein by reference.

The cutter bar is therefore mounted on the header frame across a width of the header for movement across the ground in a forward harvesting direction for harvesting the standing crop.

The cutter bar includes the longitudinally extending hollow gear case 24A which includes a bottom pan 24B with upstanding sides 24C and outwardly turned mounting flanges 24D and 24E at the upper edge of the sides 24C. The gear case also includes a top cover plate 24F extending along and covering the pan 24B. The cover plate 24F also includes side flanges 24G and 24H which cooperate with the flanges 24D and 24E and overlie those flanges so as to be fastened to them by screw fasteners 24L to form the hollow closed interior of the gear case. The top plate 24F has a series of holes 24J along its length each receiving a cast mounting ring 24K for the bearings 25BB of the spindle 25B of a respective one of the disks 26.

The gear case can comprise a single component extending across the full width of the header or it can be formed in separate sections connected end to end. In particular, in wide headers it can be formed as two separate sections connected at the center where the gear train is also separated in the two sections, with each section thus requiring drive from a respective end. The gear case can also be formed as modular or individual sections connected end to end across the cutter bar with each section having a respective one of the disks.

The cutter bar further includes a support beam 30 extending along the gear case rearwardly of the gear case. The support beam 30 extends across the full width of the header and provides structural support for the cutter bar so that it is suitably defined by a tubular member of rectangular cross section with horizontal top and bottom walls and vertical sides 30A to 30D. The beam 30 includes a rearwardly extending flange member 31 welded to the rear upstanding wall 30A and a forwardly extending flange 32 welded to the front wall 30B. The rear flange 31 comprises a U-shaped channel with the ends of the legs connected to the wall 30A and the base extending rearwardly away from the wall. The bottom leg is recessed upwardly from the bottom wall 30D. The front flange 32 comprises a bottom plate 32A connected to the wall 30B and extending forwardly away from the wall 30B. The plate 32A is recessed upwardly from the bottom wall 30D. A second plate 32B is connected at a forward end to the plate 32A and extends therefrom upwardly and rearwardly to a top of the wall 30B. The plate 32A provides support underneath the bottom pan 24B of the gear case. The rear of the gear case at the flange 24D is fastened to the plate 32B so as to connect the gear case to the beam 30 to provide support for the gear case. The forward end of the gear case is cantilevered forwardly from the support plate 32A underneath the gear case.

Figure 3:
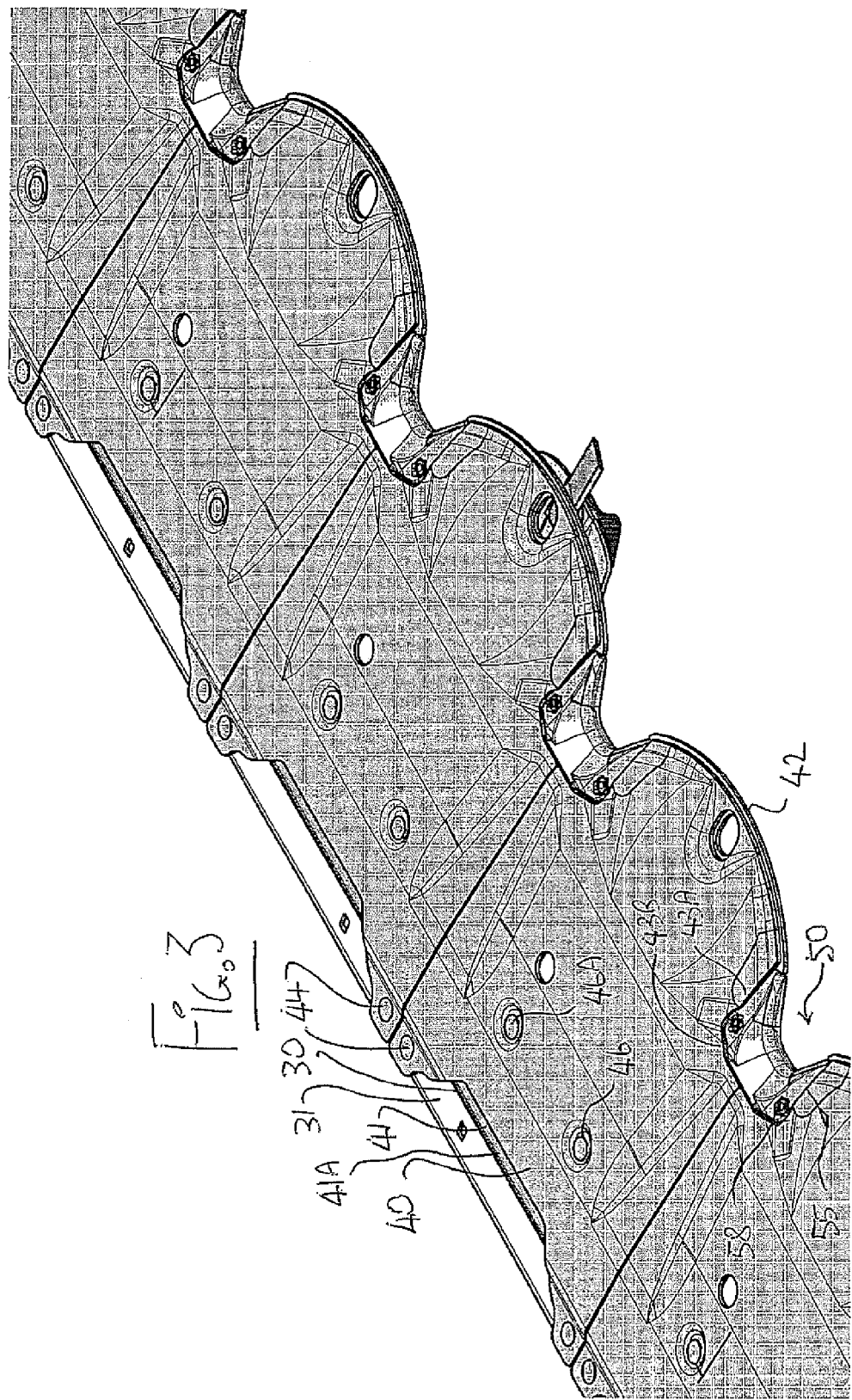
FIG. 3 is an isometric view from the bottom on an enlarged scale of the cutter bar only of the header of FIG. 1.
Figure 4:
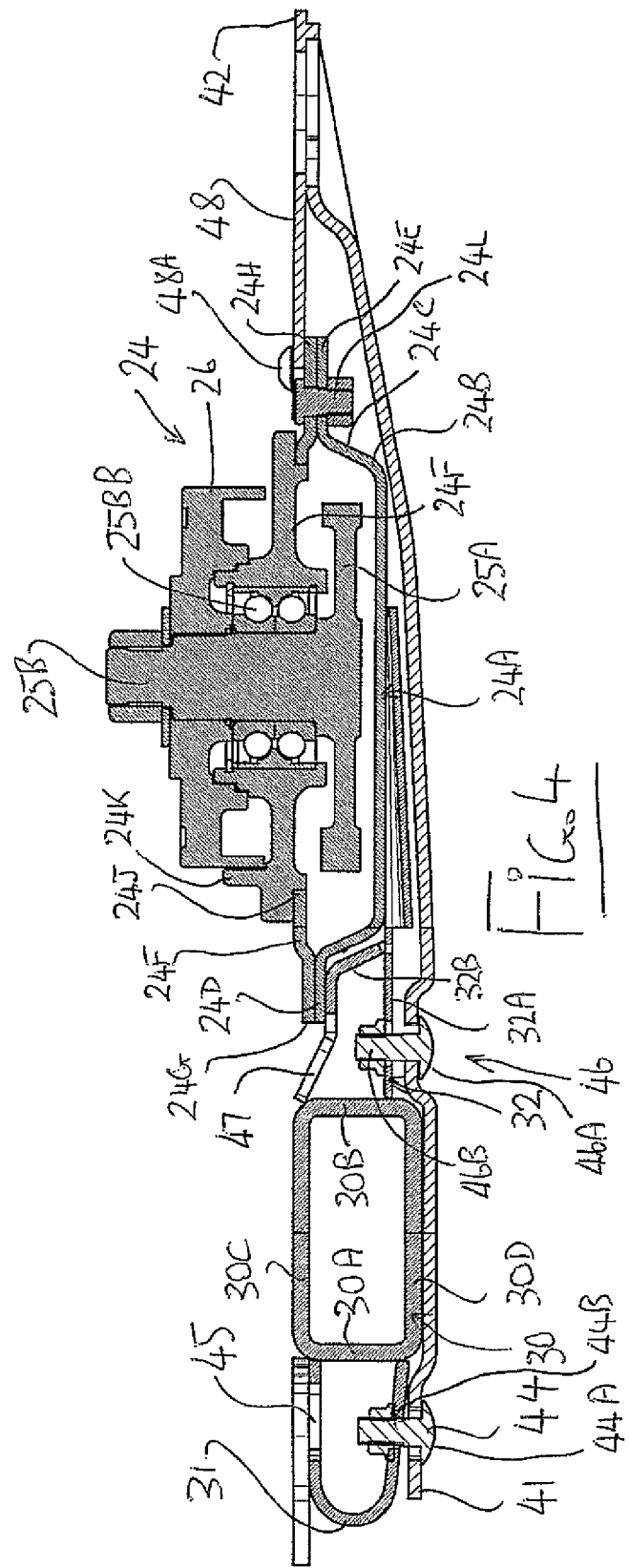
FIG. 4 is a cross sectional view along the lines 4-4 of the header of FIG. 2.

As shown in FIGS. 3 and 4 there is provided a plurality of guard plate members 40 arranged side by side in a row along the cutter bar and each extending from the beam forwardly underneath the gear case to a forward position in front of the gear case. Each guard plate has a rear edge 41 at the rear of the beam 30 and attached to the flange 31. Each guard has a curved front edge 42 generally following an arc surrounding the axis of the respective disk. In this way the curved front edge underlies the edge of the disk 26 as it rotates and the blade 27 projects forwardly from the front edge to effect the cutting action. The guard plate however covers the underside of the disk and the gear case to provide a protection against rock damage and a wear plate to concentrate wear on a replaceable plate rather than the gear case.

The guard plates have their straight side edges at right angles to the length of the cutter bar and butting edge to edge so that the guard plates cover the whole of the underside of the gear case.

Each of the guard plate members includes a first rear fastening arrangement defined by screw fasteners 44 at the rear edge 41 by which the member is connected to the flange 31. In between the fasteners 44, the rear edge is recessed forwardly of the flange 31 at a center section 41A with the sides of the rear edge forming ears 41B fastened to the flange 31. The fasteners 44 comprise a nut and bolt combination passing through and fastened to a bottom wall of the flange 31 accessible through holes 45 in the top wall of the flange 31. The recessing of the bottom wall of the flange 31 relative to the wall 30D of the beam ensures that the head 44A of the bolt 44B is recessed out of engagement with the ground to reduce wear.

Each of the guard plate members includes a second forward fastening arrangement 46 by which the member is connected to the beam 30 at the front flange 32. The second fastening arrangement is therefore located forward of the first fastening arrangement 44. The fasteners 46 comprise a nut and bolt combination passing through and fastened to a bottom wall of the flange 32 accessible through holes 47 in the top wall of the flange 31. The recessing of the plate 32A of the flange 32 relative to the wall 30D of the beam ensures that the head 46A of the bolt 46B is recessed out of engagement with the ground to reduce wear.

Thus the first fastening arrangement is behind the beam 30 and the second fastening arrangement is in front of the beam so that each guard plate member is cantilevered forwardly from the first and second fastening arrangements to the forward edge 42. At the forward edge is provided a return portion 48 fastened to the forward position in front of the gear case along the front edge and defining a horizontal plate extending rearwardly to the gear case. The portion 48 is welded along the front edge 42 so as to be carried by the cantilevered front portion of the rock guard ad to extend rearwardly to be fastened to the front flange 24E, 24H of the gear case by screw fasteners 48A to provide support for the gear case at its forward edge. In this way, the two fasteners 44 and 46 at the rear of the guard plate provide effective cantilevered support for the front edge of the guard plate which is then transferred to support of the gear case. Thus the cutter bar structure is supported and enhanced by the cooperation of the beam 30, the gear case 24A and the rock guard plates which form an integral structure all contributing to the strength. The rock guard plates are arranged side by side with butting side edges fully covering the gear case and the beam so that they act as a skid plate and also provide full protection for the covered components.

As the guard plate members include butting side edges each to the next at positions between the disks and the curved front edges 42 meet at a recessed notch area 50 between the disks. This area is particularly prone to wear in view of the fact that the crop material is swept between pairs of disks as they counter-rotate and draw the crop material between them. Thus there is provided in front of the gear case in the notch area a notch guard member 51 bridging the front edges of two guard plate members between each guard plate member and the next.

Thus each notch guard member 51 acts to cover the front edge of the guard plate members at the recessed portion. Each notch guard member is a cast wear part with a thickness greater than that of the front edge of the guard plate members. Thus each notch guard member has a top surface 52 substantially contiguous with or slightly higher than a top surface of the adjacent guard plate members. Each notch guard member has a front edge 53 at the surface 52 which provides a concave edge contiguous with the edges 42 of the adjacent guard plates. From the top surface 52 at the edge 53, the notch guard curves downwardly and rearwardly to the bottom surface 54 just in front of the bottom plate 24B of the pan of the gear case. The bottom surface projects downwardly at least to a level with and preferably slightly below a bottom surface of the adjacent guard plate members. The side edges 43 of the adjacent guard plates as shown in FIG. 3 are recessed at 43A and 43B to terminate at the side edges 55 and 56 of the notch guard 51 with the side edges 55 and 56 lying parallel to one another.

Figure 5:
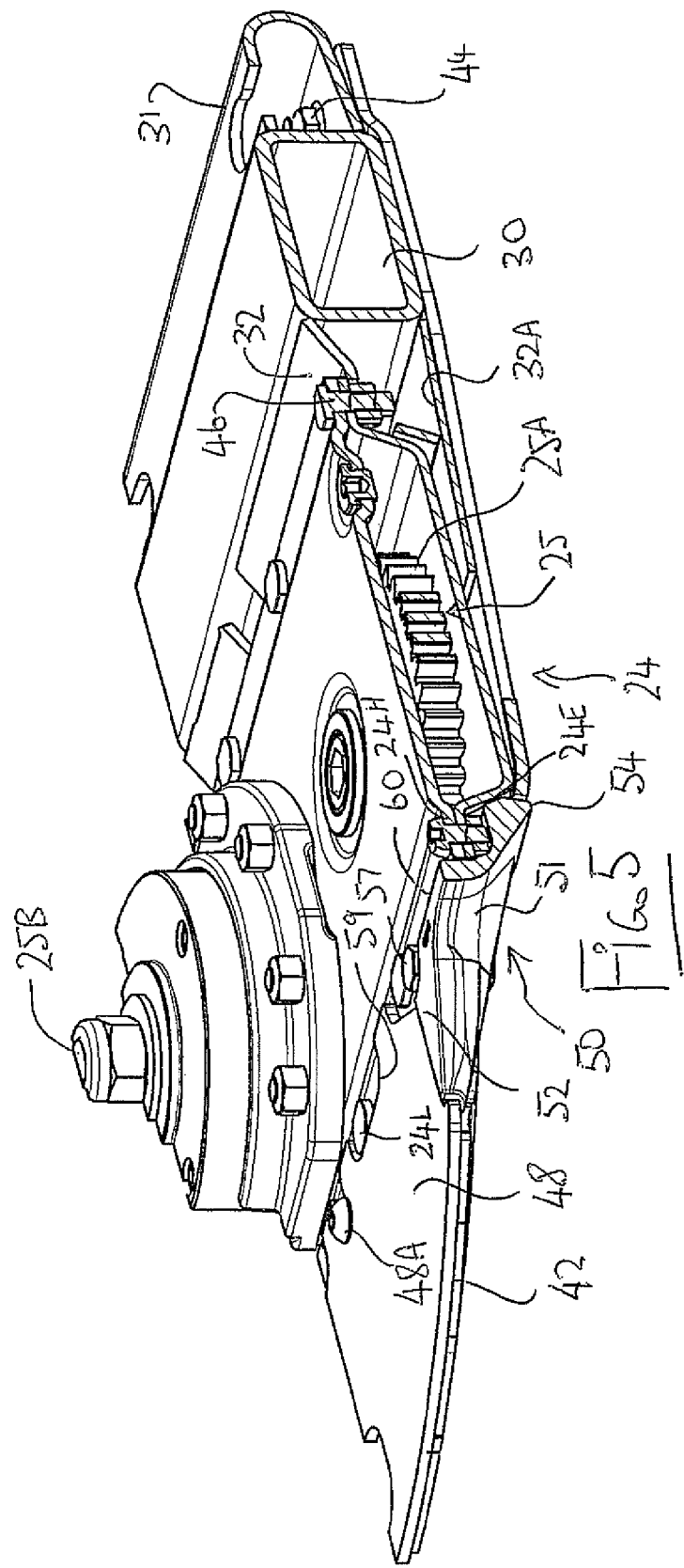
FIG. 5 is an isometric view cut along the lines 5-5 of the header of FIG. 2.

Each notch guard member is screw fastened by screws 57 passing through the flanges 24H and 24E to a recessed nut 58 on the underside of the notch guard. As shown in FIG. 5, the plates 48 is recessed at the location 59 and the top of the notch guard 51 is recessed at the location 60 to expose the top surface of the flange 24H of the gear case at the screw fasteners 48A. The notch guard 51 is relieved both on the top and on the bottom. Both the notch guard and rock guard are relieved on top for rib neck bolt 57.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:
1. A crop harvesting header comprising:
   a cutter bar mounted on a header frame across a width of the header for movement across the ground in a forward harvesting direction for harvesting the standing crop;
   the cutter bar including a longitudinally extending hollow gear case;

a plurality of generally horizontal cutter disks mounted on the cutter bar at positions spaced along the cutter bar with the disks being mounted on the cutter bar for driven rotation about respective generally upright axes spaced along the cutter bar;

each disk having mounted thereon at a position spaced outwardly from the respective axis thereof at least one cutter blade such that rotation of the disk about its axis causes a standing crop to be cut by the blade as it rotates around the axis on the disk;

the gear case including a gear train arranged to drive the cutter disks;

the cutter bar including a support beam extending along the gear case rearwardly of the gear case;

and a plurality of guard plate members arranged side by side along the cutter bar and each extending from the beam forwardly underneath the gear case to a forward position in front of the gear case;

wherein each of the guard plate members includes a first rear fastening arrangement which is connected to the member and is connected to the beam thereby connecting the member to the beam and a second forward fastening arrangement which is connected to the member and is connected to the beam thereby connecting the member to the beam with the second fastening arrangement being forward of the first fastening arrangement.

2. The header according to claim 1 wherein the first fastening arrangement is behind the beam and the second fastening arrangement is in front of the beam.

3. The header according to claim 2 wherein the beam includes a rearwardly extending flange to which the first fastening arrangement is attached and a forwardly extending flange to which the second fastening arrangement is attached.

4. The header according to claim 1 wherein the beam comprises a rectangular tube.

5. The header according to claim 1 wherein each of the fastening arrangements comprises a pair of bolts which are recessed from a bottom surface of the guard plate member.

6. The header according to claim 1 wherein each guard plate member is cantilevered forwardly from the first and second fastening arrangements to the forward position and is connected to the gear case to provide support therefor.

7. The header according to claim 6 wherein each guard plate member includes a return portion fastened to the forward position in front of the gear case and extending rearwardly to the gear case so as to be fastened thereto.

8. The header according to claim 1 wherein the guard plate members include butting side edges each to the next so as to provide a continuous guard fully covering the underside of the casing.

9. The header according to claim 1 wherein each guard plate member underlies a respective one of the disks and includes a curved front edge generally following an arc surrounding the axis of the respective disk.

10. The header according to claim 1 wherein the guard plate members include butting side edges each to the next at positions between the disks so that the curved front edges meet at a recessed front position of the front edges between the disks and wherein there is provided in front of the gear case a notch guard member bridging the front edges of two guard plate members between each guard plate member and the next.

11. The header according to claim 10 wherein each notch guard member covers the front edge of the guard plate members at the recessed portion.

12. The header according to claim 10 wherein each notch guard member has a thickness greater than that of the front edge of the guard plate members.

13. The header according to claim 10 wherein each notch guard member is a cast wear part.

14. The header according to claim 10 wherein each notch guard member has a top surface contiguous with a top surface of the adjacent guard plate members and a bottom surface projecting downwardly at least to a level with a bottom surface of the adjacent guard plate members.

15. The header according to claim 10 wherein each notch guard member is screw fastened to gear case.

16. A crop harvesting header comprising:
a cutter bar mounted on a header frame across a width of the header for movement across the ground in a forward harvesting direction for harvesting the standing crop;

the cutter bar including a longitudinally extending hollow gear case having a forwardmost edge of the gear case;

a plurality of generally horizontal cutter disks mounted on the cutter bar at positions spaced along the cutter bar with the disks being mounted on the cutter bar for driven rotation about respective generally upright axes spaced along the cutter bar;

each disk having mounted thereon at a position spaced outwardly from the respective axis thereof at least one cutter blade such that rotation of the disk about its axis causes a standing crop to be cut by the blade as it rotates around the axis on the disk;

the gear case including a gear train arranged to drive the cutter disks;

the cutter bar including a support beam extending along the gear case rearwardly of the gear case;

and a plurality of guard plate members arranged side by side along the cutter bar and each attached to the beam and extending from the beam forwardly underneath the gear case to a forward position of the guard plate member which is located forwardly of the forwardmost edge of the gear case;

wherein each guard plate member is supported by the beam so that it is cantilevered forwardly from the beam to the forward position of the guard plate member and the forward position of the guard plate member is connected to the gear case by fastener members connected between the guard plate member and the gear case to provide support for the gear case.

17. The header according to claim 16 wherein each guard plate member includes a return portion fastened to the forward position in front of the gear case and extending rearwardly to the gear case so as to be fastened thereto.

18. The header according to claim 16 wherein the guard plate members include butting side edges each to the next so as to provide a continuous guard fully covering the underside of the casing.

19. A crop harvesting header comprising:
a cutter bar mounted on a header frame across a width of the header for movement across the ground in a forward harvesting direction for harvesting the standing crop;

the cutter bar including a longitudinally extending hollow gear case;

a plurality of generally horizontal cutter disks mounted on the cutter bar at positions spaced along the cutter bar with the disks being mounted on the cutter bar for driven rotation about respective generally upright axes spaced along the cutter bar;

each disk having mounted thereon at a position spaced outwardly from the respective axis thereof at least one cutter blade such that rotation of the disk about its axis causes a standing crop to be cut by the blade as it rotates around the axis on the disk;

the gear case including a gear train arranged to drive the cutter disks;

the cutter bar including a support beam extending along the gear case rearwardly of the gear case;

and a plurality of guard plate members arranged side by side along the cutter bar and each attached to the beam and extending from the beam forwardly underneath the gear case to a forward position in front of the gear case;

wherein each adjacent pair of the guard plate members include butting side edges each to the next so as to provide a continuous guard fully covering the underside of the casing;

each guard plate member underlies a respective one of the disks and includes a curved front edge generally following an arc surrounding the axis of the respective disk;

wherein the curved front edges of each pair of guard plate members meet at a recessed front position of the front edges of the guard plate members between the disks;

and a plurality of notch guard members separate from the guard plate members;

wherein each separate notch guard member is located in front of the gear case between a respective pair of guard plate members and bridges the front edges of the pair of the guard plate members across the butting side edges between each guard plate member and the next.

20. The header according to claim 19 wherein each separate notch guard member covers the front edge of the guard plate members at the recessed portion.

21. The header according to claim 19 wherein each separate notch guard member has a thickness greater than that of the front edge of the guard plate members.

22. The header according to claim 19 wherein each separate notch guard member is a cast wear part.

23. The header according to claim 19 wherein each separate notch guard member has a top surface contiguous with a top surface of the adjacent guard plate members and a bottom surface projecting downwardly at least to a level with a bottom surface of the adjacent guard plate members.

24. The header according to claim 19 wherein each separate notch guard member is screw fastened to the adjacent guard plate members.

* * * * *